Aug. 8, 1939.  M. W. SEYMOUR  2,169,009
METHOD OF COLOR CORRECTION FOR COLOR PHOTOGRAPHY
Filed Nov. 13, 1936  2 Sheets-Sheet 1
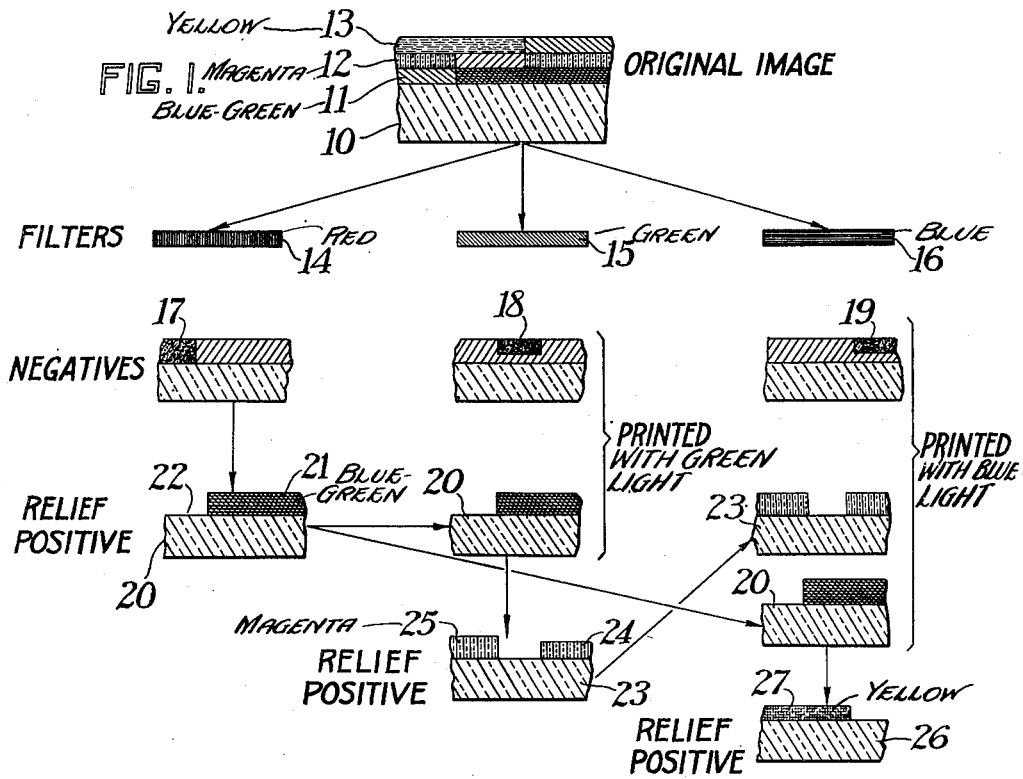
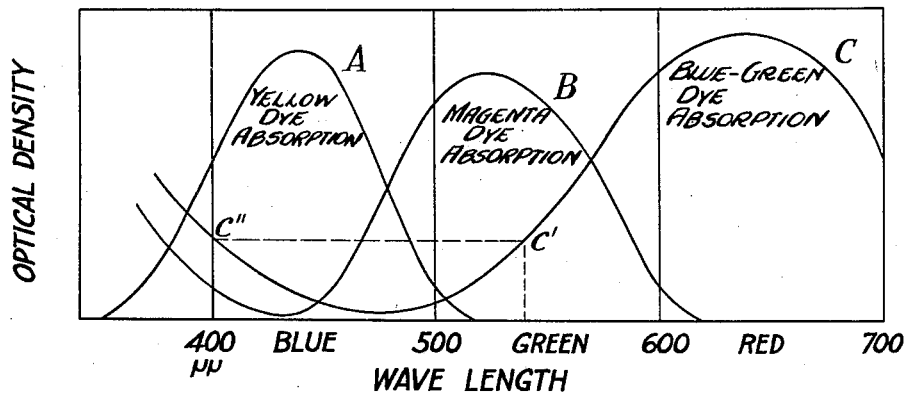
Merrill W. Seymour
INVENTOR.

Aug. 8, 1939.  M. W. SEYMOUR  2,169,009

METHOD OF COLOR CORRECTION FOR COLOR PHOTOGRAPHY

Filed Nov. 13, 1936  2 Sheets—Sheet 2

Merrill W. Seymour
INVENTOR.

BY
ATTORNEYS

Patented Aug. 8, 1939

2,169,009

UNITED STATES PATENT OFFICE 2,169,009

METHOD OF COLOR CORRECTION FOR COLOR PHOTOGRAPHY

Merrill W. Seymour, Rochester, N. Y., assignor to Eastman Kodak Company, Rochester, N. Y., a corporation of New Jersey Application November 13, 1936, Serial No. 110,699

9 Claims. (Cl. 95—2)

This invention relates to color photography and particularly to a method for color correction in printing color photographs.

It is well known that color prints made with printing inks, pigments or dyes by uncorrected methods of photo-mechanical or photographic color reproduction always suffer from degradation with more or less grey. This is due to the fact that some of the printing inks, pigments or dyes absorb light not only in the spectral regions which they are intended to absorb but also to some extent in other regions. According to the subtractive method of color photography the color-separation images are printed in colors complementary to the colors of the taking filters. In three-color photography the usual trichrome filters are colored red, green and blue and the color-separation images obtained from these are printed, respectively, in blue-green, magenta and yellow colors. If theoretically accurate printing inks, pigments or dyes could be obtained, these inks, pigments or dyes should absorb only their complementary colors. The blue-green pigment or dye should absorb the red region of the spectrum and transmit the blue and the green regions. Similarly, the magenta pigment or dye should absorb the green region of the spectrum and transmit the blue and the red regions and the yellow pigment or dye should absorb the blue region and transmit the red and the green regions.

In practice, a set of three pigments or dyes has not been found, each of which absorbs in only one of these regions without absorbing somewhat in either of the other regions as well. In particular, the blue-green pigment or dye usually absorbs not only in the red region but also to a lesser degree in the green and the blue regions. The magenta pigment or dye absorbs not only in the green region but also in the blue region. Its absorption in the red region is usually negligible. The yellow pigment or dye, however, is usually very efficient, absorbing very little except in the blue and violet region.

As a result of the light absorption by the blue-green dye, pigment, or ink in the green and blue regions of the spectrum, unless certain corrections are applied, a lower concentration of magenta or yellow dye or pigment must be used in the color print, to maintain a balance of color in the scale of greys, than would otherwise be used. The final result is, then, that the blue-greens, greens, and blues of the color print are less luminous than they should be—i. e., they are degraded with grey—while the magentas, yellows, reds and pinks of the print are lacking in saturation—i. e., they are diluted with white.

To correct for these undesired absorptions of the printing colors, various schemes have been devised. The method in most common use in photo-mechanical color reproduction processes consists of hand retouching of the negatives or positives, or of "fine etching" the printing plates so that less magenta and yellow inks are printed in those portions of the picture where blue-green ink is printed. These are hand operations.

A photographic method of achieving the result, which has been used to some extent, consists of making positive silver transparencies of low contrast from the red and green filter negatives and placing these in register with the green and blue filter negatives for photographically printing the corresponding positives which are to be dyed or "inked up" in the magenta and yellow subtractive printing dyes or inks either in a photo-mechanical process or in a photographic process. To give a more specific example, the low-contrast grey silver positive from the red filter negative may be combined with the green filter negative to print the magenta printer positive and the same or another low-contrast grey silver positive from the red filter negative or low-contrast silver positives from both the red and green filter negatives may be combined with the blue filter negative to print the yellow printer positive. On account of the flattening produced in the scale of greys by this procedure, a corresponding increase in the contrast of the magenta and yellow images must be made at some point. If these adjustments in contrast are made in the original negatives, then, unless steps are taken to keep the high-light densities for the neutral the same in all three negatives, an adjustment in the printing exposures for the magenta and yellow printer positives is also required. These changes require careful sensitometric control including the measurement of densities, the development of the masking positives to the correct contrast, and the calculation or empirical determination of correct printing exposures.

Moreover, the making of these positive masks, although less laborious than hand retouching or "fine etching," involves extra operations and the use of extra photographic materials as compared to printing without color correction.

It is, therefore, an object of the present invention to provide a simple method for overcoming the deficiencies in the transmission of the pigments or dyes used in printing color photographs. It is a further object to provide a method for making an equivalent color transparency or print on paper from a three-color transparency or print on paper. It is a still further object to provide a method for overcoming the loss in contrast of certain of the part images when making color-corrected prints from color separation negatives that have been developed in the normal way without increasing the gamma of the green and blue filter negatives. A still further object is the achievement of photographic color correction in three-color photographic or photomechanical processes without the use of extra photographic materials or additional photographic operations. Other objects will appear from the following description of my invention.

I accomplish these objects by the use of a novel masking method in printing from color-separation negatives and preferably by controlling the gammas of the component dye or pigment images themselves.

In the accompanying drawings

Fig. 1 is a diagram of the method of making color-separation negatives and corrected prints, according to my invention;

Fig. 2 is a graph showing absorption curves for typical blue-green, magenta and yellow dyes used in printing;

Figure 3:
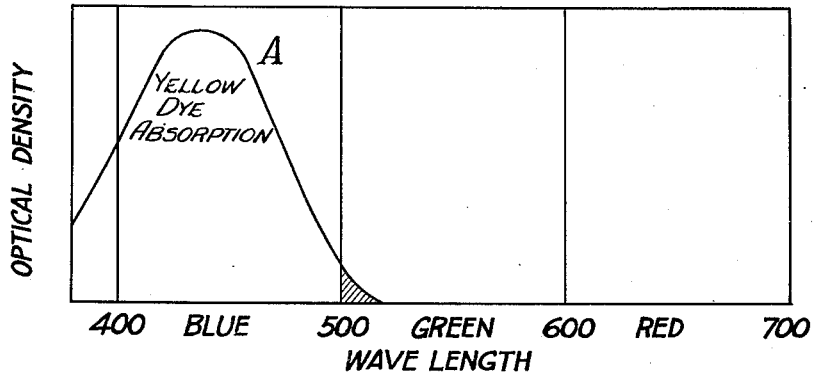
Fig. 3 is a similar graph for the yellow dye alone.

What I propose, according to the present invention, is a method which causes the printing colors to make their own corrections more or less automatically. This method is more easily carried out in those processes which produce color transparencies either as the final print or as an intermediate step. It is, therefore, particularly applicable in the three-color carbon double-transfer process, the so-called Trichrome Carbro process, the Eastman wash-off relief process, the Duxochrome process, the Chromatone process, and others. In all of these processes the color-separation images are printed as positives in subtractive colors and may be transferred to paper to form the final print.

I will illustrate my process by describing it in detail with reference to the accompanying drawings. The description will refer to the Eastman wash-off relief process from which its application to other processes will be apparent.

Three-color separation negatives are first produced in any suitable manner, as by photographing an object directly through filters in primary colors, or by printing from a natural color transparency. If these are to be used for making a color print on paper, they are preferably developed to a gamma of about 0.5. If they are to be used for printing a transparency, they are preferably developed to a gamma of about 1.0.

In Fig. 1 of the drawings I have shown a natural color transparency 10 consisting of superposed part color images 11, 12 and 13 colored, respectively, blue-green, magenta and yellow. This transparency is printed separately through red filter 14, green filter 15 and blue filter 16. These filters transmit the primary colors only and may be, for example, Wratten No. 29 for the red, Wratten No. 61 for the green and Wratten No. 49 for the blue. In this way I obtain color-separation negatives 17, 18 and 19 which represent, respectively, the red, green and blue components of the original image.

The red filter negative 17 is printed onto wash-off relief film to form a positive relief image. This process is carried out as follows: The film on which the relief image is to be printed, which consists of a yellow-dyed silver bromide emulsion layer on a transparent support is positioned so that a contact or projection print may be made on it through the negative. The positive material is placed with its support side toward the negative. It is exposed for a suitable length of time and is then developed for about 5 minutes in a developer having the following formula:

| | | |
|---|---|---|
| Water | cc | 500 |
| Monomethyl para aminophenol sulfate | grams | 1 |
| Sodium sulfite (desiccated) | do | 75 |
| Hydroquinone | do | 9 |
| Sodium carbonate (desiccated) | do | 25 |
| Potassium bromide | do | 5 |
| Water to | liter | 1 |

The film is then washed thoroughly in running water and treated in a bleaching solution of the following formula for three minutes or longer to complete bleaching of the silver:

*Solution A*

| | | |
|---|---|---|
| Water | cc | 500 |
| Ammonium bichromate | grams | 20 |
| Sulfuric acid | cc | 14 |
| Water to | liter | 1 |

*Solution B*

| | | |
|---|---|---|
| Sodium chloride | grams | 45 |
| Water to | liter | 1 |

Use one part A, one part B and six parts water.

The relief image is developed by treatment with 2 to 4 changes of water at 110° F., giving one minute in each bath. The film is then cleared by placing it in the fixing bath for about one minute and washed in running water.

| | | |
|---|---|---|
| Water | cc | 500 |
| Sodium thiosulfate ("hypo") | grams | 240 |
| Sodium sulfite (desiccated) | do | 10 |
| Sodium bisulfite | do | 25 |
| Water to | liter | 1 |

The relief positive printed from the red filter negative is dyed in a known manner in a solution of a suitable blue-green acid dye. The dye concentration and acidity of this solution are so adjusted that when the relief image has come to equilibrium with the solution, the resulting dye image has a gamma of about 1.0. The gamma may be determined by measuring the densities of various areas of the blue-green image by transmitted light of wavelengths approximating that of the maximum visual absorption of the dye and plotting these densities against the densities of the corresponding areas of the red filter negative. Ordinarily, it is not necessary to determine this gamma for each print, since a sensitometric strip may be made under similar conditions to the prints and the proper composition of the dye bath determined on the basis of this strip. Also, the blue-green densities may be read with a densitometer through a red filter such as Wratten No. 25, and a correction factor applied to the gamma determined in this manner. Usually, the gamma determined through a filter is somewhat lower than the gamma determined with monochromatic light at the wavelength of maximum absorption.

In controlling the gamma of the dye image, increasing the concentration of dye in the solution or increasing the acidity of the solution (an acid dye is assumed) tend to raise the gamma of the dye image at equilibrium. Decreasing the concentration of dye in the solution or decreasing the acidity of the solution tend to lower the gamma.

If the gamma of the blue-green dye image is made considerably greater than 1 by transmitted light, the resulting color print will be somewhat over-corrected, while if the gamma is considerably less than 1, the color print will be somewhat under-corrected. There is, however, some tolerance in the degree of correction permissible. Sometimes, as in making a photographic color print from a photographic color transparency, it is desirable to increase the degree of correction in the print to compensate for degradation of color in the original photograph.

The blue-green relief positive obtained in this way is represented at 20 on the accompanying drawings. It consists of a blue-green image portion 21 and a clear portion 22 where the unexposed gelatin was washed off.

The blue-green relief positive 20 is then registered with the green filter negative 18 and this combination used to print the green filter relief positive 23 which is processed in the same manner as the blue-green relief positive described above. It is then dyed in a known manner in a solution of an acid magenta dye, the concentration and acidity of the solution being adjusted so that the magenta dye image, when superimposed upon the blue-green dye image gives a blue image in the scale of greys that appears neither reddish nor greenish when seen through a yellow filter such as Wratten No. 12. I. e., the superimposed images of a scale of greys should as closely as possible match in hue an actual scale of greys when both are seen through the yellow filter. This printing step may be accomplished with either green or blue light but if the positive material is sensitive to only blue light, this color must be used in the printing. The reason for using light of one of these colors will be explained below. The correct printing exposure for the masked green filter negative is somewhat greater than for the unmasked negative on account of the highlight density of the blue-green mask to the printing light. Usually, an increase of about 15% in printing exposure is sufficient to compensate for the mask. The image obtained through the masked negative will be thinner at the portions covered by the blue-green relief positive as shown at 24, whereas it will be the full strength at the other portions as shown at 25.

The blue-green relief positive 20 and the magenta relief positive 23 are registered with the blue filter negative 19 and printed with blue light onto relief film to obtain the blue filter relief positive 26. This is processed in the manner described above and is dyed yellow in a solution of a suitable acid yellow dye, the concentration and acidity of which are adjusted to give an image of the proper contrast so that when the blue-green, magenta, and yellow dye images are superimposed, the scale of greys will be properly reproduced. The masked blue filter negative usually requires about 30% greater printing exposure than the unmasked negative. The relief 27 obtained from the masked negative will be thinner at the portions covered by the blue-green and magenta relief positives.

Any suitable acid dyes may be used to color the positive prints made as described above. The following are suitable:
Blue-green    Lissamine Green BS    Schultz No. 836
Magenta       Azo Rubine            Schultz No. 208
Yellow        Metanil Yellow        Schultz No. 169

The relief positives 20, 23 and 26 obtained in this way may be combined as a color transparency or may be used to make an imbibition print on paper.

The reason for making the color corrections as outlined above will now be explained with reference to Figs. 2, 3, 4, and 5 of the accompanying drawings. These figures show graphs representing the optical densities of typical blue-green, magenta and yellow dyes plotted against the wave length in the spectrum. The relative concentrations of the dyes are assumed to be adjusted so that when the three dyes are superimposed, a neutral grey is produced. The graph A represents the yellow dye, the graph B represents the magenta dye and the graph C represents the blue-green dye.

Figure 4:
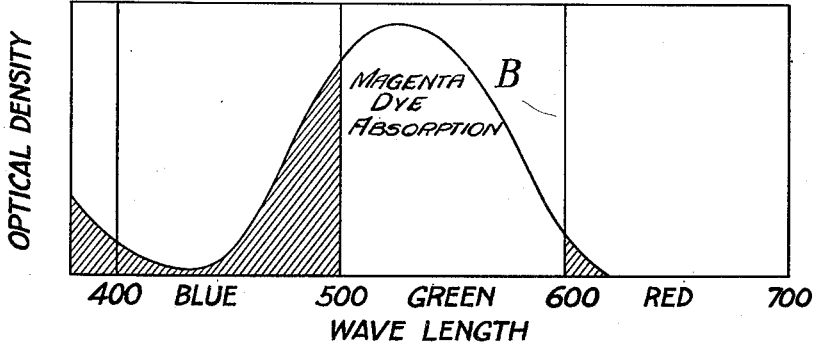
Fig. 4 is a similar graph for the magenta dye alone.
Figure 5:
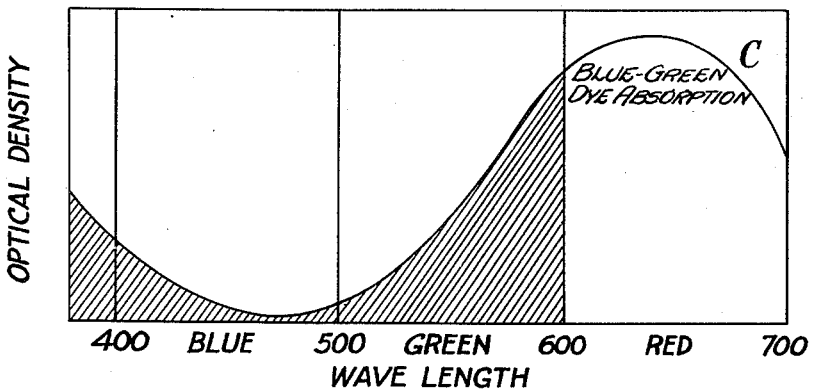
Fig. 5 is a similar graph for the blue-green dye alone.

In Figs. 3, 4 and 5 the shaded portions represent the regions of light absorbed by the dye where light absorption is not desired. In Fig. 3 the graph A shows that the yellow dye absorbs mainly its complementary color blue from 400 to 500 millimicrons. There is also a small amount of absorption in the region between 500 and 600 millimicrons, but this is negligible.

As shown in Fig. 4, the graph B indicates that the magenta dye absorbs mainly in the green region from 500 to 600 millimicrons. There is, however, a considerable amount of absorption in the blue region from 400 to 500 millimicrons. In a similar manner, the graph C in Fig. 5 shows that the blue-green dye absorbs mainly in the red region from 600 to 700 millimicrons, but that there is a large amount of absorption in the blue and green regions between 400 and 600 millimicrons. The absorption in the latter regions is undesirable since the blue-green dye is expected to transmit light in the blue and green regions.

In order to compensate for the amount of green light absorbed by the blue-green dye the magenta relief positive, which should alone absorb green light, may be made thinner at the portions covered by the blue-green relief image in direct proportion to the amount of blue-green dye present at those portions. In a similar manner, in order to compensate for the amount of blue light absorbed by the blue-green and magenta relief positives, the yellow relief positive, which should alone absorb blue light may be made thinner at the portions covered by the blue-green and magenta relief images in direct proportion to the amount of blue-green and magenta dye contained at those portions. This correction is made automatically and correctly by the method described above in which the blue-green and magenta relief images themselves are used to mask the printing of the magenta and yellow relief positives. For example, in the printing of the magenta relief positive 23 the blue-green relief positive 20 absorbs a certain amount of green light which normally would be absorbed by the magenta image. At the portions of the relief image 23 covered by the blue-green relief image 20 the magenta image, therefore, made thinner as is shown at 24 in proportion to the density of the blue-green image to the printing light and thus compensation is made for the green absorption of the blue-green dye.

When printing the magenta relief positive with blue-violet light in the manner described above theoretically full corrections will be obtained in the green region of the spectrum only if the green and blue-violet absorption of the blue-green dye are equal since the green filter negative is printed with blue light, whereas it should be printed with green light. Where the light absorbed in the blue and green regions is nearly the same, the same correction is obtained by printing with either color of light. Frequently, the green absorption of the blue-green dye is only slightly greater than the blue absorption and for this reason a fairly accurate correction can often be made by printing with blue light.

In the use of certain blue-green dyes, however, another factor enters which enables the printing of the magenta positive with blue light to be accomplished with a fairly high degree of accuracy. As shown in Fig. 2 of the drawings, the curve C indicates a blue-green dye with an optical density in the extreme violet at $c''$ (about 400 millimicrons) which is equal to its mean density in the green region (equal to the height of the curve at $c'$, or about 540 millimicrons). For this reason, when printing with violet light of about 400 millimicrons wave length the same correction of color is obtained that would be obtained by printing with green light at 540 millimicrons wave length. This fact permits the use of a blue-violet sensitive material for printing each of the relief positives.

In printing the magenta and yellow positive relief images the contrast is lowered in the scale of greys, and hence these images do not correspond with the contrast of the blue-green relief positive. This lowering of the contrast or gamma may be compensated for by increasing the acetic acid or the dye concentration in these dye solutions until the scale of greys is correctly rendered by the three superimposed relief images. By making the adjustment of contrast in the positives instead of the negatives the printing exposures are not disturbed and the three negatives of a set do not have to be developed to different gammas, which are determined by the requirements of the masking process—an operation which often requires the separation negatives to be retaken to correct errors in development.

The method described above may be used for making contact prints or enlargements from color-separation negatives. In making enlargements by this method each enlarged positive may be placed in the focal plane of the enlarger and registered with the projected image of the negative which it is intended to mask during the printing. The film to be printed can then be slipped under the positive and exposed through it while the positive is held in a hinged frame or by register pins or in any other suitable manner.

Although I have described my method of automatic color correction as applied to making prints on paper from three-color transparencies, it is to be understood that my method may also be used for color correction of prints made from color-separation negatives obtained in any suitable manner as by exposure from the original or from another paper print. The positives printed from the negatives need not be relief positives but may be made by any method in which subtractive color component positives are obtained. These corrected positives may be then combined to form natural color transparencies or may be applied to paper by imbibition or by any other suitable method to make a print which is reviewed by reflection.

Instead of using dyed or pigmented positives on transparent support as masks for the separation negatives, positive prints on paper may also be used in the following manner:

The blue-green print on white paper is placed on a copy board and illuminated. An image of this print is formed in the focal plane of a camera. The green filter negative is registered with the image of the blue-green print and held in place with suitable clamps. Then, a print from the green filter negative is made on a plate, film, or paper placed in the back of camera by means of the light reflected by the print on white paper and coming through the green filter negative. In a similar manner, the blue-green or magenta print on white paper may be placed on the copy board and used as a mask for the blue filter negative.

In the event that prints transferred to paper are used as masks by reflected light, the color separation negatives which are being masked are preferably developed to a gamma of about 1.0 instead of 0.5 as when images destined to be transferred to paper are used as masks by transmitted light.

My described method of automatic color correction may also be used for the purpose of obtaining color-corrected continuous or half-tone positives or negatives for use in the photomechanical reproduction of color, as, in the half-tone process or in the photogravure or rotogravure process.

For example, the dyes used for staining the relief images in the course of my automatic masking method as applied to the wash-off relief process may be selected to match the inks used in the photomechanical reproduction. Then a proof may be printed on paper by imbibition from the color-corrected relief positives. The positives may then be redyed in the same manner as the first time.

If color-corrected negatives are desired, as in the half-tone process, these may be obtained by photographing each dyed relief positive through a filter of complementary color onto a panchromatic material such as a process panchromatic plate with or without a half-tone screen in front of the panchromatic material. For example, the blue-green (or "blue") positive is photographed through a red filter, the magenta (or "red") positive through a green filter, and the yellow positive either through a blue filter, or, what is equivalent, without any filter onto a material sensitive to blue-violet only, such as a non-color sensitized wet collodion plate.

Instead of dyeing the three color-corrected relief positives the second time in the three printing colors they may all be dyed the same color. For example, they may be dyed with a dye absorbing blue-violet. Such a dye may be grey, red, brown, orange, yellow, green, etc. Then the similarly dyed relief positives may be printed or copied in a camera with or without a half-tone screen onto a non-color sensitized material in order to make continuous or half-tone color-corrected separation negatives.

The color-corrected half-tone negatives may be used to make prints on a metal coated with a suitable resist for etching plates in the half tone process.

The color-corrected relief positives, dyed with a dye or dyes that absorb the actinic printing rays may also be used as the positives for printing sensitized photogravure or rotogravure tissue.

If preferred, relief positives dyed blue-green and magenta, respectively, (in which case the magenta positive may be color-corrected or not) may be used as masks for the green filter and blue filter separation negatives to print other positives as on an ordinary silver bromide emulsion. These other positives thus become color-corrected positives and may be used for printing color-corrected continuous or half-tone negatives or may be used for printing onto photogravure or rotogravure tissue.

Color-corrected prints in subtractive colors that have been transferred to paper may also be used for the making of color-corrected positives or negatives by copying them through appropriate color filters with a camera.

It is to be understood that the examples given in the above specification are by way of illustration only and that my invention is to be taken as limited by the scope of the appended claims.

I claim:

1. The method of forming an image in natural colors which comprises making photographic color-separation negatives of an object through primary color filters, and successively printing positives therefrom in the three subtractive printing colors by using each colored positive that absorbs light of at least one primary color that it should not theoretically absorb as a mask for any of said negatives exposed by light of those primary colors of which the undesired absorption occurs, each such positive that is printed through a mask being printed with light of a color which is complementary to the color with which the final positive being printed is colored, and combining said color component positives to produce a natural-color image.

2. The method of forming an image in natural colors which comprises making photographic color-separation negatives of an object through primary color filters, and successively printing positives therefrom in the three subtractive printing colors by using each colored positive that absorbs light of at least one primary color that it should not theoretically absorb as a mask for any of said negatives exposed by light of those primary colors of which the undesired absorption occurs, each such positive that is printed through a mask being printed with light of a color which the mask absorbs to a degree approximately equal to the color complementary to the color of the final positive being printed, and combining said color component positives to produce a natural-color image.

3. In a process for reproducing objects in natural colors, the step of making a print with green light from a green filter separation black-and-white negative through a blue-green color positive print from a red filter separation negative.

4. In a process for reproducing objects in natural colors, the step of making a print with blue-violet light from a blue filter separation black-and-white negative through both blue-green and magenta color positive prints from red and green filter separation negatives respectively.

5. In a process for reproducing objects in natural colors, the step of making a print from a green filter separation black-and-white negative through a blue-green color positive print from a red filter separation negative, said print from the green filter separation negative being made with light in a region of the spectrum other than green, but in a region for which the said blue-green positive image has approximately the same absorption as it has for the green region.

6. In a process for reproducing objects in natural colors, the step of making a print with white light on material sensitive only to blue-violet light, from a blue filter separation black-and-white negative through both blue-green and magenta color positive prints from red and green filter separation negatives respectively.

7. The method of reproducing an object in natural colors which comprises forming red, green, and blue color separation black-and-white negatives of the object, printing a blue-green transparent positive from the red color separation negative, printing a magenta transparent positive with green light from the green color separation negative and the blue-green color positive, and printing a yellow transparent positive with blue light from the blue color separation negative and the blue-green and magenta color positives, and combining the three positives thus produced to form a natural-color image.

8. The method of reproducing an object in natural colors which comprises forming red, green and blue color separation black-and-white negatives of the object, printing a positive image from the red color separation negative and coloring the image blue-green with a dye which absorbs blue and green light of definite wave-lengths in nearly equal amounts, printing a positive image from the green color separation negative and the blue-green color positive and coloring the image magenta, and printing a positive image from the blue color separation negative and the blue-green and magenta color positives and coloring the image yellow, all of the printing being done with monochromatic blue light, and combining the positives thus produced to form a natural-color image.

9. The method of reproducing an object in natural colors which comprises forming red, green, and blue color separation black-and-white negatives by printing a natural-color transparency separately through red, green, and blue filters, printing a positive image from the red color separation negative and coloring the image blue-green with a dye which absorbs blue and green light of definite wave-lengths in nearly equal amounts, printing a positive image from the green color separation negative and the blue-green color positive and coloring the image magenta, and printing a positive image from the blue color separation negative and the blue-green and magenta color positives and coloring the image yellow, all of the printing being done with essentially monochromatic blue light, and combining the positives thus produced to form a natural-color image.

MERRILL W. SEYMOUR.